United States Patent [19]

Lin

[11] Patent Number: 5,259,270
[45] Date of Patent: Nov. 9, 1993

[54] BICYCLE PEDAL

[76] Inventor: Wen-Hwa Lin, No. 243-5, Chan Shen Road, Tian San Tsun, Wai Pu Hsiang, Taichung Hsien, Taiwan

[21] Appl. No.: 998,624

[22] Filed: Dec. 30, 1992

[51] Int. Cl.⁵ .............................................. G05G 1/14
[52] U.S. Cl. .................. 74/594.6; 74/594.4; 36/131
[58] Field of Search ............ 74/594.4, 594.6, 560; 36/131, 132; D21/194; 482/63

[56] References Cited

U.S. PATENT DOCUMENTS

| | | | |
|---|---|---|---|
| 4,932,287 | 6/1990 | Ramos | 36/131 |
| 5,003,841 | 4/1991 | Nagano | 74/594.6 |
| 5,048,369 | 9/1991 | Chen | 74/594.6 |
| 5,115,692 | 5/1992 | Nagano | 74/560 |
| 5,125,173 | 6/1992 | Nagano et al. | 36/131 |

FOREIGN PATENT DOCUMENTS

| | | | |
|---|---|---|---|
| 0428140 | 5/1991 | European Pat. Off. | 36/131 |
| 3937358 | 5/1990 | Fed. Rep. of Germany | 36/131 |
| 3924601 | 1/1991 | Fed. Rep. of Germany | 36/131 |
| 3-157285 | 7/1991 | Japan | 74/560 |
| 2252029 | 7/1992 | United Kingdom | 36/131 |

*Primary Examiner*—Vinh T. Luong
*Attorney, Agent, or Firm*—Varndell Legal Group

[57] ABSTRACT

A bicycle pedal having a pedal body and at least one swivel hook plate and one fixed hook plate spaced on either side, thereof and at least one plate spring received in a respective chamber on the pedal body which presses on either swivel hook plate against the respective fixed hook plate. Either swivel hook plate can be turned outwards relative to the respective fixed hook plate for fastening or unfastening the bottom fastening plate of a bicycle shoe.

3 Claims, 6 Drawing Sheets 5,259,270

BICYCLE PEDAL

BACKGROUND AND SUMMARY OF THE INVENTION

The present invention relates to bicycle pedals, and relates more particularly to a bicycle pedal which has hook plates on either side controlled by a respective plate spring for fastening the bottom fastening plate of a bicycle shoe.

While pedaling the pedals in moving a bicycle, the feet may move out of place easily, thereby causing a transmission error. In order to eliminate this problem, there is proposed a pedal having hook members on two opposite sides for securing a bicycle shoe, which is specifically designed for riding bicycles and has a bottom fastening plate for positioning. FIGS. 1 and 2 illustrate a bicycle pedal of this type. As illustrated, the bicycle pedal comprises a base having an unitary center tube, a spindle having one end inserted in the center tube and secured in place by bearings, two holder plates respectively and symmetrically fastened to the base at two opposite sides by screw bolts and bushings, two pedal frames respectively fastened to the base over the holder plates by screws, two pairs of movable hook members respectively retained in two chambers on either holder plate by transverse pins, two pairs of spring coils respectively fastened to the movable hook members by screw bolts and stop plates, and two fixed hook members respectively fastened to the center tube of the base at two opposite sides by screw. When assembled, the fixed hook members are respectively disposed toward the movable hook members for fastening the bottom fastening plate of a bicycle shoe. This structure of bicycle pedal is functional. However, this bicycle pedal is expensive to manufacture because it is consisted of many small parts. This bicycle pedal is also complicated and difficult to assemble because many screws and screw bolts are used to fasten the parts to the base and there is little space for turning a screw driver or like tool.

One object of the present invention is to provide a bicycle pedal which has means for securing a bicycle shoe. Another object of the present invention is to provide a bicycle pedal which is simple in structure. Still another object of the present invention is to provide a bicycle pedal which is inexpensive to manufacture and easy to assemble.

According to the preferred embodiment of the present invention, the bicycle pedal comprises two plate springs fastened in two opposite chambers on a pedal body thereof at two oppsite sides by screws, two swivel hook plates revolvably fastened in the chambers by screws and respectively pressed inward by the plate springs, and two fixed hook plates fastened to the base at two opposite sides. By turning either swivel hook plate outwards relative to the respective fixed hook plate, the bottom fastening plate of a bicycle shoe can be fastened to or disconnected from the pedal body. Adjusting screws are fastened in respective holes on the pedal body for adjusting the spring force applied by the plate spring to the swivel hook plates.

DETAILED DESCRIPTION OF THE PREFERRED EMBODIMENT

Figure 1:
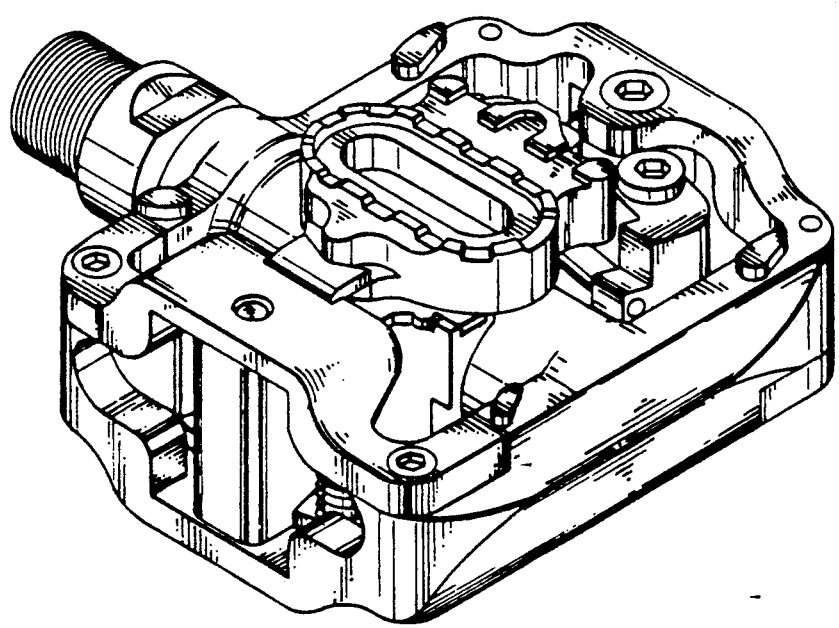
FIG. 1 is an elevational view of a bicycle pedal according to the prior art.
Figure 2:
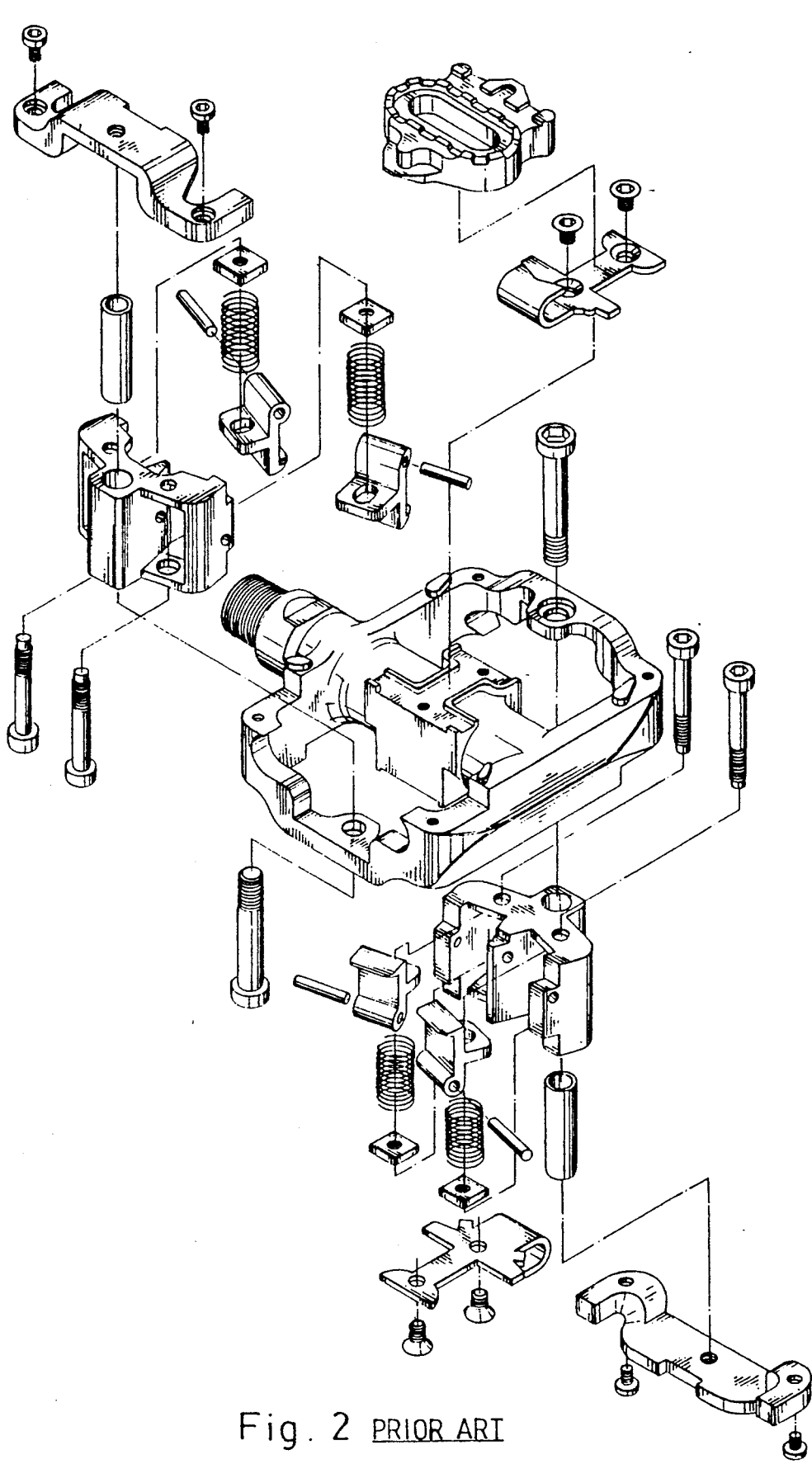
FIG. 2 is an exploded view of the bicycle pedal of FIG. 1.
Figure 3:
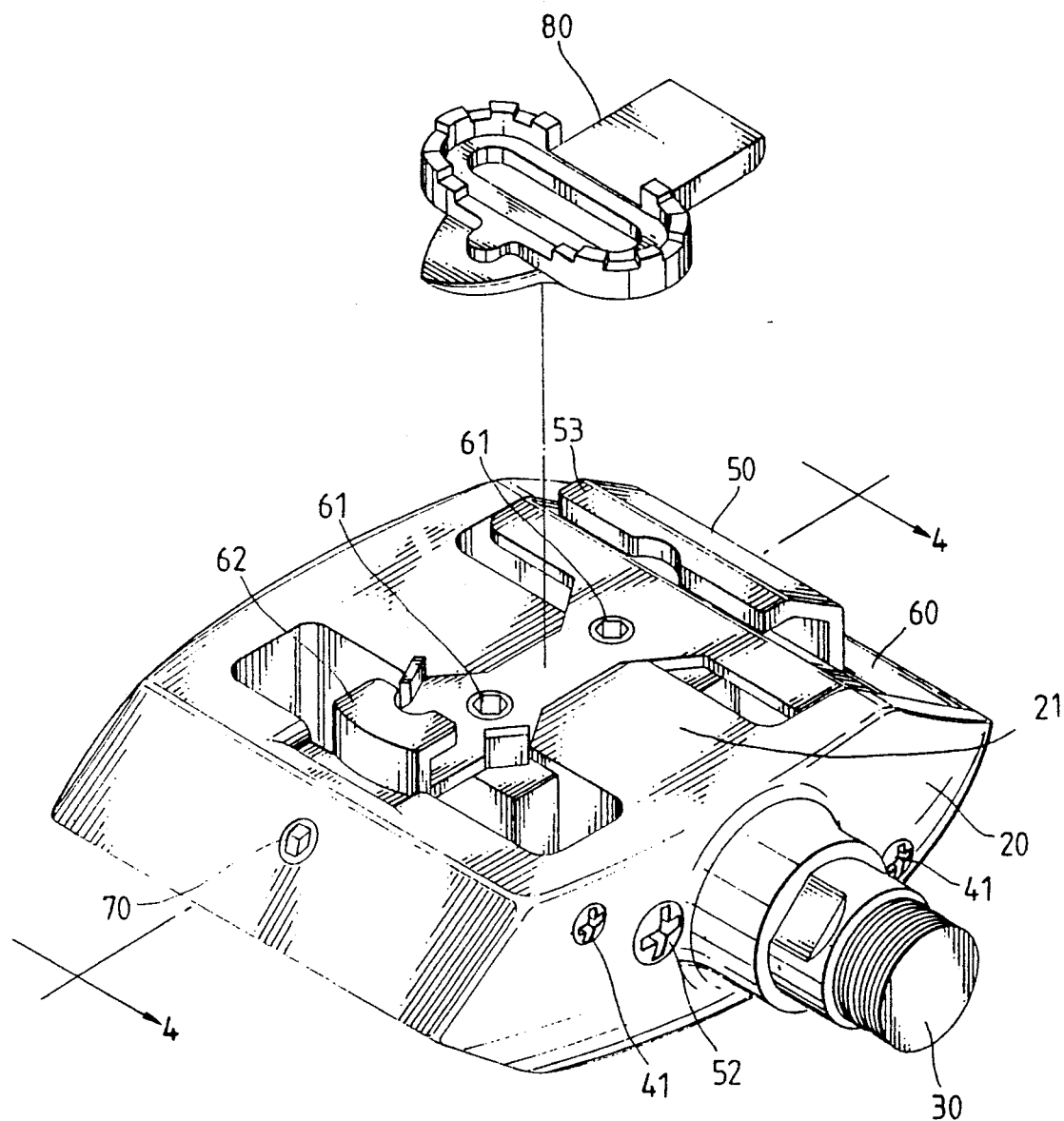
FIG. 3 is an elevational view of a bicycle pedal according to the present invention and a bottom fastening plate for a bicycle shoe.
Figure 4:
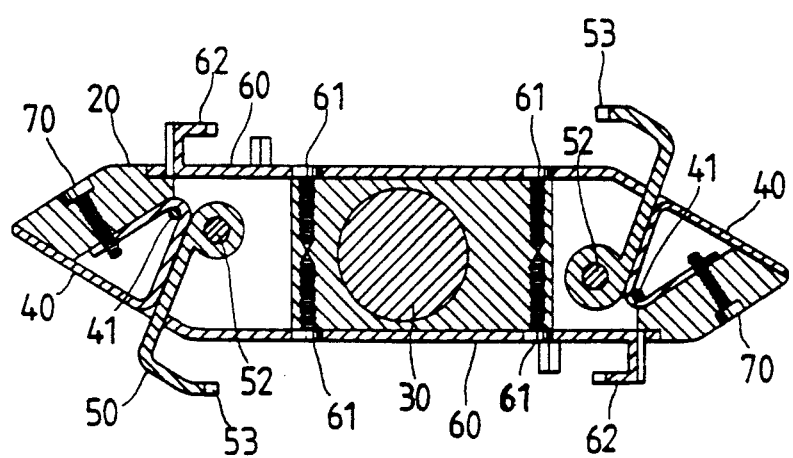
FIG. 4 is a sectional end view 4—4 of the bicycle pedal of FIG. 3.
Figure 5:
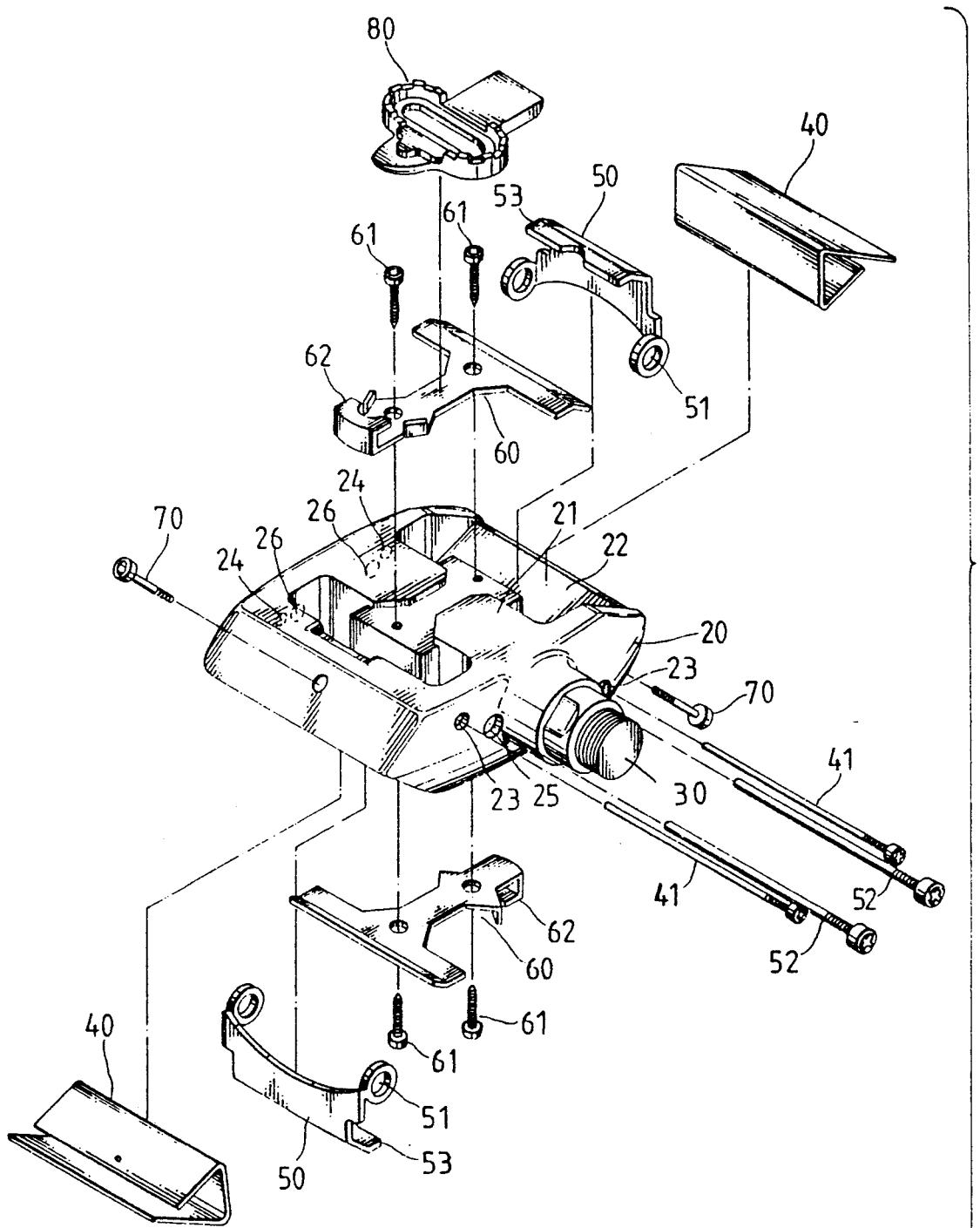
FIG. 5 is an exploded view of the bicycle pedal of FIG. 3.

Referring to FIGS. 3, 4 and 5, a bicycle pedal as contructed in accordance with the present invention is generally comprised of a pedal body 20, a spindle 30, two plate springs 40, two swivel hook plates 50, two fixed hook plates 60, and two adjusting screw 70.

The pedal body 20 is made in the shape of a substantially rectangular frame having a center tube 21 in longitudinal direction, two opposed chambers 22 disposed on two opposite sides relative to the center tube 21 and made gradually smaller towards the outside in reversed directions, through holes 23, 25 and screw holes 24, 26 respectively aligned on two opposite side walls of the chambers 22.

The spindle 30 has one end inserted into the center tube 21 of the pedal body 20 and revolvably secured in place by bearings (not shown).

The plate spring 40 are respectively made in a substantially triangular configuration. By inserting screws 41 through the through holes 23 and the holes defined within the plate springs 40 and then threading them into the respective screw holes 24, the plate springs 40 are retained inside the chambers 22 respectively.

The swivel hook plates 50 have each two spaced loops 51 on one end inserted in either chamber 22 and revolvably secured in place by a respective screw 52, which is inserted through either through hole 25 and the loops 51 and then threaded into the respective screw hole 26, and a hook 53 on an opposite end extended out of the pedal body and forced by the respective plate spring 40 to press toward the center tube 21. Therefore, each swivel hook plate 50 can be turned on the respective screw 52 relative to the center tube 21.

The fixed hook plates 60 are respectively fastened to the pedal body 20 by screws 61, having each one end stopped against the inside wall of the respective swivel hook plate 50 and an opposite end terminated to a hook 62 spaced from and faced towards the hook 53 of the respective swivel hook plate 50.

The adjusting screws 70 are respectively threaded through two opposite holes 27 on the pedal body 20 into a respective screw hole (not shown) on either plate spring 40. By screwing the adjusting screws 70 inwards or outwards, the spring force applied by the plate springs 40 to the swivel hook plates 50 is relatively adjusted.

The assembly process of the bicycle pedal is easy and outlined hereinafter. The plate springs 40 are respectively inserted in the chambers 22 of the pedal body and then secured in place by inserting screws 41 through respective through holes 23 and the holes defined within the plate spring 40 and then threading the screws 41 into respective screw holes 24. Then, the swivel hook plates 50 are respectively inserted in the chambers 22 and secured in place by inserting screws 52 through respective through holes 25 and the loops 51 of the swivel hook plates 50 and then threading the screws 52 into respective screw holes 26. Then, the fixed hook plates 60 are respectively fastened to the pedal body 20 at two opposite sides by screws 61.

Figure 6:
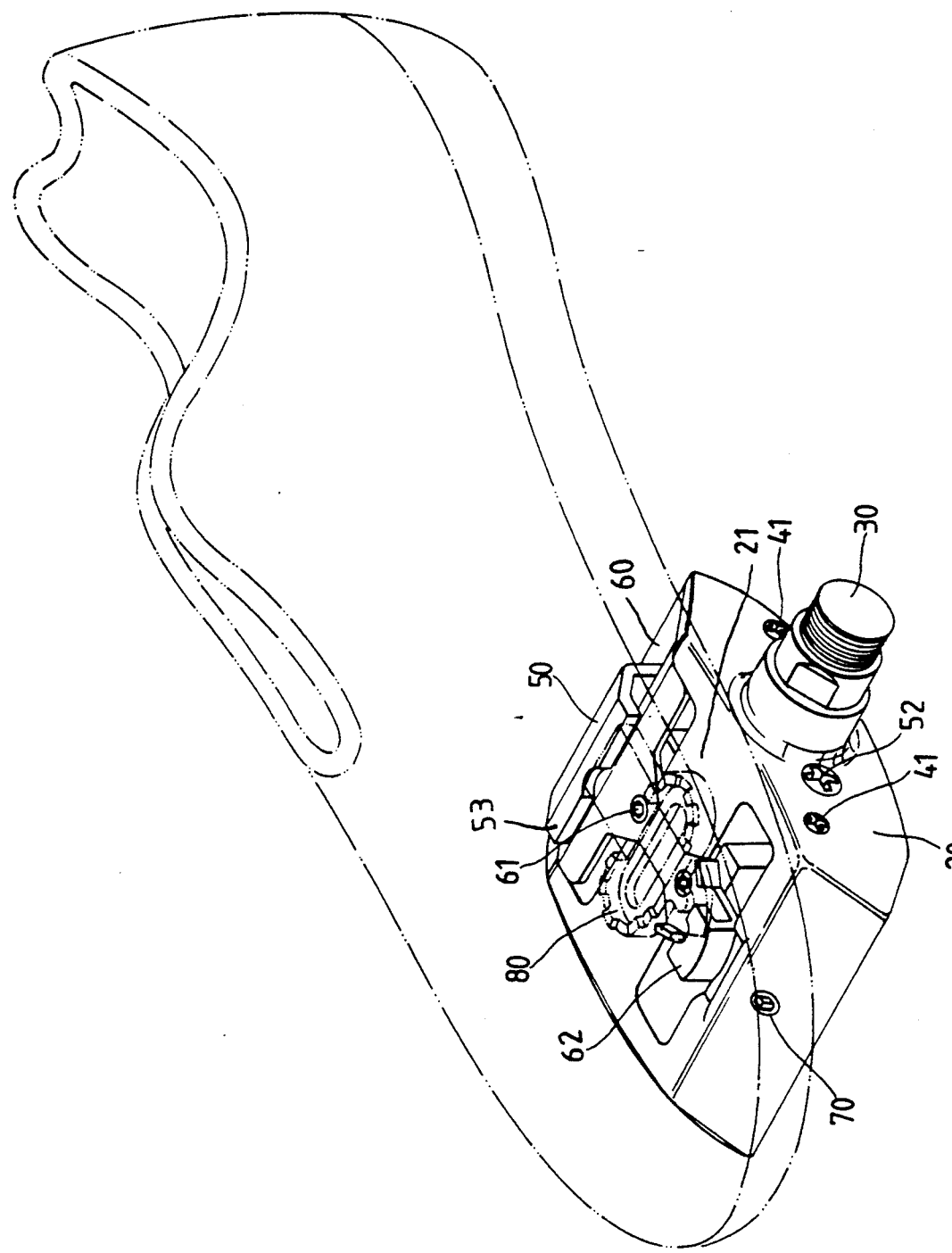
FIG. 6 illustrates the bottom fastening plate of a bicycle shoe fastened to the pedal body by the swivel and fixed hook plates of the same side.

Referring to FIG. 6, by means of the hooks 53, 62 of either swivel hook plate 50 and the respective fixed hook plate 60, the bottom fastening plate 80 of the bicycle shoe, which is specifically designed for riding a bicycle, can be conveniently fastened to the pedal for positive pedaling. Separating the bottom fastening plate 80 from the pedal is also easy. By turning the bottom fastening plate 80 sideways in turning the respective swivel hook plate 50 outwards from the center tube 21, the bottom fastening plate 80 can be disconnected from the hook 62 of the respective male fastening element 60 and then separated from the pedal.

I claim:

1. A bicycle pedal comprising:
   a substantially rectangular pedal body having an unitary center tube in longitudinal direction, at least one chamber respectively disposed at either side adjacent to said center tube;
   a spindle having one end revolvably fastened to said center tube;
   at least one plate spring respectively fastened in either chamber on said pedal body;
   at least one swivel hook plate, each swivel hook plate having one end revolvably fastened in either chamber and an opposite end terminated to a hook projecting out of said pedal body at either side and pressed toward said center tube by either plate spring;
   at least one fixed hook plate respectively and fixedly fastened to said pedal body at either side, each fixed hook plate having one end stopped at either swivel hook plate against either plate spring and an opposite end terminated to a hook spaced from and facing toward the hook of the respective swivel hook plate; and
   wherein the hook of either swivel hook plate can be turned outwards relative to the hook of the respective fixed hook plate for fastening or unfastening a bottom fastening plate of a bicycle shoe.

2. The bicycle pedal of claim 1 wherein two fixed hook plates are respectively fastened to said pedal body at two opposite sides, two swivel hook plates are respectively and turnably fastened in two chambers on said pedal body and respectively forced by two spring plates toward said center tube.

3. The bicycle pedal of claim 1 which further comprises at least one adjusting screw respectively threaded through a respective hole on said pedal body for regulating the spring force applied by the respective plate spring pedal body to the respective swivel hook plate.

* * * * *